United States Patent
Berres et al.

(10) Patent No.: US 8,783,774 B2
(45) Date of Patent: Jul. 22, 2014

(54) DRIVE UNIT FOR A VEHICLE SEAT

(75) Inventors: Michael Berres, Bergisch Gladbach (DE); Frank Großbudde, Wuppertal (DE); Jürgen Stemmer, Remscheid (DE); Martin Stilleke, Recklinghausen (DE); Andreas Rabbach, Solingen (DE)

(73) Assignee: Johnson Controls Components GmbH & Co. KG, Kaiserslautern (DE)

( * ) Notice: Subject to any disclaimer, the term of this patent is extended or adjusted under 35 U.S.C. 154(b) by 238 days.

(21) Appl. No.: 13/387,543

(22) PCT Filed: Aug. 20, 2010

(86) PCT No.: PCT/EP2010/005105
§ 371 (c)(1),
(2), (4) Date: Jan. 27, 2012

(87) PCT Pub. No.: WO2011/026569
PCT Pub. Date: Mar. 10, 2011

(65) Prior Publication Data
US 2012/0119554 A1    May 17, 2012

(30) Foreign Application Priority Data

Sep. 1, 2009 (DE) .......................... 10 2009 040 460

(51) Int. Cl.
*B60N 2/20* (2006.01)
(52) U.S. Cl.
USPC .................... 297/362.11; 297/361.1; 297/362

(58) Field of Classification Search
CPC ...... B60N 2/02; B60N 2/0224; B60N 2/0232; B60N 2/20; B60N 2/22; B60N 2/2213; B60N 2/2231; B60N 2/225
USPC .......................... 297/361.1, 362, 362.11, 366
See application file for complete search history.

(56) References Cited

U.S. PATENT DOCUMENTS

| | | |
|---|---|---|
| 5,634,689 A | 6/1997 | Putsch et al. |
| 6,918,635 B2 | 7/2005 | Finner et al. |
| 7,314,250 B1 * | 1/2008 | Eblenkamp et al. .......... 297/362 |
| 2004/0254041 A1 * | 12/2004 | Becker et al. ................. 475/162 |
| 2007/0200408 A1 * | 8/2007 | Ohta et al. ............... 297/362.11 |
| 2009/0127910 A1 | 5/2009 | Stilleke et al. |
| 2010/0308634 A1 * | 12/2010 | Narita et al. .................. 297/362 |
| 2011/0012413 A1 * | 1/2011 | Du et al. ....................... 297/362 |

FOREIGN PATENT DOCUMENTS

| | | |
|---|---|---|
| CN | 1457306 A | 11/2003 |
| CN | 1572584 A | 2/2005 |
| CN | 101516675 A | 8/2009 |
| CN | 101652266 A | 2/2010 |
| DE | 4436101 A1 | 6/1995 |

(Continued)

Primary Examiner — Philip Gabler
(74) Attorney, Agent, or Firm — McGlew and Tuttle, P.C.

(57) ABSTRACT

A drive unit (5) for a vehicle seat, in particular for a motor vehicle seat, has a motor (51), a gear unit which is provided on the drive output side of the motor (51) which has at least a drive output wheel which is rotatably supported about a core axis (K). The drive output wheel is provided with a core (59) which is rotatable about the core axis (K). The core (59) has a shaft receptacle (60) for a drive shaft (7) with a shaft axis (W) as central axis. The core axis (K) and the shaft axis (W) are offset in parallel by an eccentricity.

20 Claims, 6 Drawing Sheets

(56) References Cited

FOREIGN PATENT DOCUMENTS

| | | |
|---|---|---|
| DE | 19709852 A1 | 9/1998 |
| DE | 19938666 A1 | 2/2001 |
| DE | 19709852 C2 | 8/2003 |
| DE | 102004040602 A1 | 10/2005 |
| DE | 202008016335 U1 | 3/2009 |
| FR | 2856127 A1 | 12/2004 |
| JP | H03-21237 U | 3/1991 |
| JP | 2005-502438 A | 1/2005 |
| WO | 2009022776 A1 | 2/2009 |

* cited by examiner

DRIVE UNIT FOR A VEHICLE SEAT

CROSS REFERENCE TO RELATED APPLICATIONS

This application is a United States National Phase application of International Application PCT/EP2010/005105 and claims the benefit of priority under 35 U.S.C. §119 of German Patent Application DE 10 2009 040 460.0 filed Sep. 1, 2009, the entire contents of which are incorporated herein by reference.

FIELD OF THE INVENTION

The invention relates to a drive unit for a vehicle seat having a motor, a gear unit which is provided on the drive output side of the motor and which has at least a drive output wheel which is rotatably supported about a core axis.

BACKGROUND OF THE INVENTION

From DE 197 09 852 C2 a drive unit of this kind for adjusting seats is known. A motor drives an input gear stage which, in turn, drives a planetary gear as an output gear stage. The output wheel which is configured as a hollow wheel has in its center an out-of-round perforation in which a molded part, which is connected in a rota-tionally rigid manner with a shaft, engages with a positive fit, such shaft being aligned with the drive output wheel.

SUMMARY OF THE INVENTION

The invention is based on the object of improving a drive unit of the type mentioned in the introduction.

According to the invention, this object is achieved by a drive unit for a vehicle seat, in particular for a motor vehicle seat, having a motor, a gear unit which is provided on the drive output side of the motor and which has at least a drive output wheel which is rotatably supported about a core axis. The drive output wheel is provided with a core which is rotatable about the core axis. The core has a shaft receptacle for a drive shaft with a shaft axis as a central axis. The core axis and the shaft axis are offset in parallel by an eccentricity.

Due to the fact that the drive output wheel is provided with a core that is rotatable about the core axis, with the core having a shaft receptacle for a drive shaft with a shaft axis as a central axis, wherein the core axis and the shaft axis are offset in parallel by an eccentricity with respect to each other, a fitting—which is, for example, provided for adjusting the inclination of the backrest—with an eccentric epicyclic gear—can be driven also on the side which wobbles relative to the drive shaft, without making it necessary to provide a particular wobble compensation. This increases the possibilities of the application of both the drive unit and the fitting.

The use of an eccentric epicyclic gear system in a fitting (on either side of the vehicle seat) enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric which is composed, for example, of two wedge segments which are tensioned apart by means of a spring, or of a sickle-shaped element, preferably is supported on its side which is opposed to the slide bearing, for example on its inner side, on a collar of the other fitting part.

To make use of the advantage according to the invention, in a system having a drive unit according to the invention and fittings of such kind, the two axes, which are relevant for the eccentric, align with the two axes which are made available by the drive unit. The wobble compensation is thus guaranteed permanently.

The core preferably is configured separately from the drive output wheel, so that the exact alignment of the drive output wheel is insignificant for assembling. Core and drive shaft are then inserted only after the drive unit and the fittings have been fixed, for example jointly on the backrest. Besides, in a modular system, a further core without eccentricity can be made available for cases in which the fitting shall be mounted inversely, so that no wobble compensation becomes necessary. To reduce the number of components, the core and the drive output wheel can also be configured in one piece. To simplify manufacturing, the basic body of the drive output wheel can also be configured separately from a journal pin. If the drive unit and one of the two fittings are arranged close to each other with respect to space, the driver of the fitting and the core of the drive unit can be configured in one piece on this side of the vehicle seat, so that the drive shaft reaches only up to the other side of the vehicle seat.

The invention is explained in more detail hereinafter with reference to exemplary embodiments shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 6:
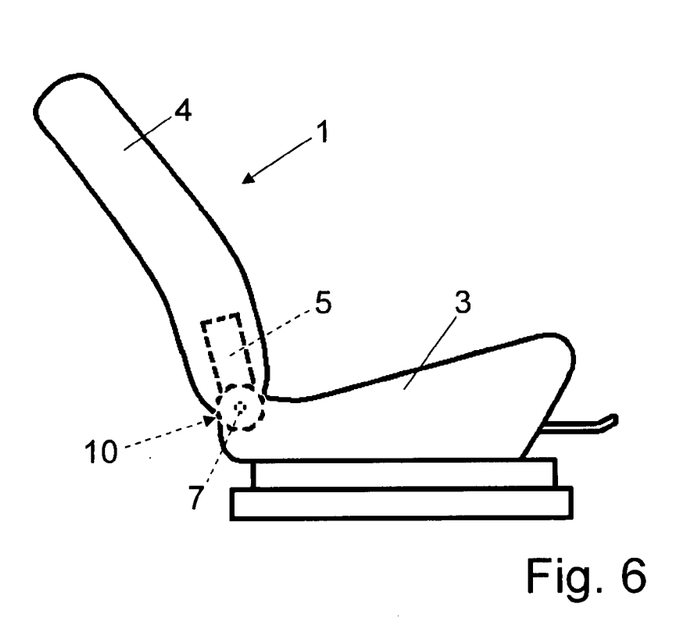
FIG. 6 is a schematic view of a vehicle seat.

Referring to the drawings in particular, a vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated, in the present case by means of a drive unit 5. On both sides of the vehicle seat 1, the drive shaft 7 engages in a fitting 10 so that the drive shaft 7 is rotationally secure, in a manner which will be described later on. The drive shaft 7 defines the adopted directional data of a cylinder coordinate system.

Figure 4:
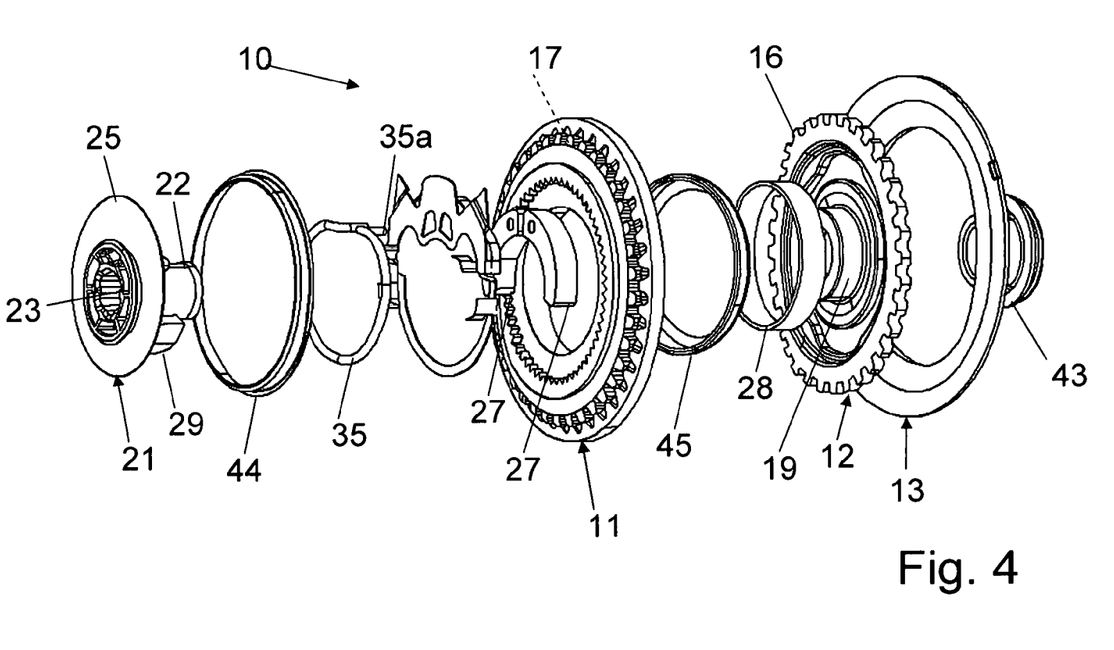
FIG. 4 is an exploded view of the fitting.
Figure 5:
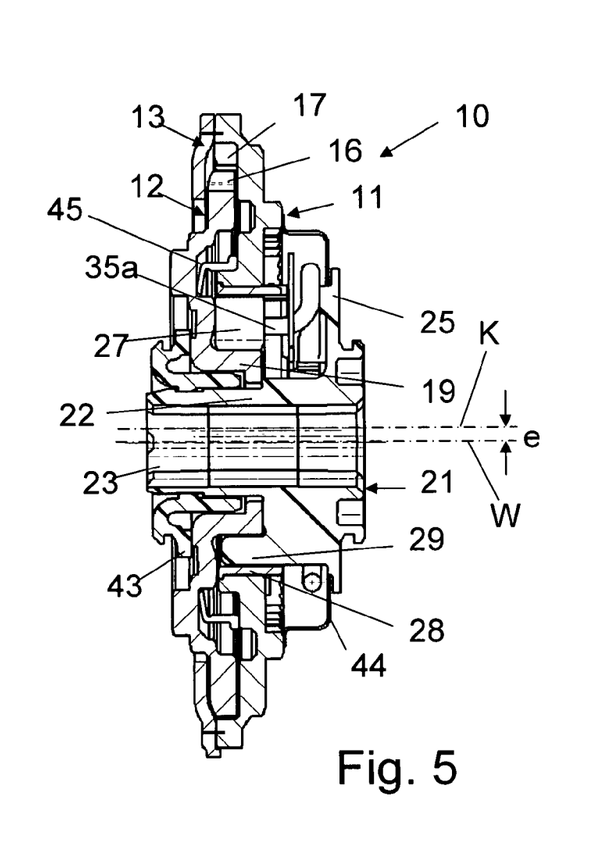
FIG. 5 is a sectional view showing an axial cut through the fitting.

The fitting 10 has a first fitting part 11 and a second fitting part 12 which are rotatable relative to one another. Each of the two fitting parts 11 and 12 can be approximately inscribed in a circular disc shape. The two fitting parts 11 and 12 are preferably composed of metal, in particular steel which, at least in some areas, can be hardened. In order to absorb the axially acting forces, i.e. in order to hold the fitting parts 11 and 12 axially together, an enclosing ring 13 is provided. Such holding together by means of an enclosing ring is described, for example, in U.S. Pat. No. 6,799,806B2. The enclosing ring 13 is preferably composed of metal, in particular of steel, which is preferably unhardened. The enclosing ring 13 has a substantially flat ring shape.

The enclosing ring 13 is fixedly connected (in the present case in an outer edge section) with one of the two fitting parts 11 and 12, in the present case with the first fitting part 11, for example welded or flanged over (at least partly in the peripheral direction). By means of an end section which is facing radially inward, the enclosing ring 13 engages radially outward over the other one of the two fitting parts 11 and 12 which is movable relative to it, if appropriate by the interposition of a separate sliding ring, without impeding the relative rotation of the two fitting parts 11 and 12. Moreover, the inner surfaces of the two fitting parts 11 and 12 which face one another are protected from the intrusion of foreign material and from impurities and damage.

The enclosing ring 13 and the fitting part 11 or 12 which is tightly connected with it consequently enclose the other one of the two fitting parts 11 and 12 which is movable relative to them. From a structural point of view, the two fitting parts 11 and 12 together (with the enclosing ring 13) consequently form a discshaped unit.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 can, however, also be exchanged, i.e. the first fitting part 11 would then be fixed with respect to the seat part and the second fitting part 12 would be fixed with respect to the backrest. The fitting 10 is located in the force flow between backrest 4 and seat part 3.

The fitting 10 is configured as a gear fitting, in which the first fitting part 11 and the second fitting part 12 are connected to each other by means of a gear unit for displacement and fixing in position, to be more precise, by means of an eccentric epicyclic gear system, which in the present case is self-locking as described, for example, in DE 44 36 101 A1, the relevant disclosure of which is expressly incorporated herein and corresponding U.S. Pat. No. 5,634,689 is hereby incorporated by reference in its entirety.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16. The toothed wheel 16 and the toothed ring 17 are formed preferably by means of one single stamping process which simultaneously punches the fitting parts 11 and 12 from their initial material. Alternatively, the fitting parts 11 and 12—with similar geometries and functions—can be manufactured by solid forming (preferably by cold extrusion or hot extrusion). In the present case, the toothed wheel 16 builds the radially outer edge of the second fitting part 12, i.e. the second fitting part 12 ends radially outward with the toothed wheel 16.

One of the two fitting parts 11 and 12, in the present case the second fitting part 12, has a collar 19 concentrically to the toothed wheel 16. The collar 19 can be integrally formed on (i.e. formed in one piece with) said fitting part as a collar formation or be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disc 25 which is formed in one piece with the hub 22 and which has a larger diameter than the hub 22.

Supported on the collar 19—with their curved inner surfaces—are two wedge segments 27 which bear—with their curved outer surfaces—the other of the two fitting parts 11 and 12, in the present case the first fitting part 11. For this purpose, a receptacle of the lastnamed fitting part is coated with a slide bearing bush 28 which is preferably pressed in to be rotationally fixed, and against which the outer surfaces of the wedge segments 27 bear. The notions "support" and "bear" shall not be limited to a defined direction of the flow of forces by the fitting 10, since this direction depends on the mounting of the fitting 10.

The driver 21 has—spaced radially from the hub 22—a driver segment 29 which engages with clearance between the narrow sides of the wedge segments 27 and which is formed in one piece with the covering disc 25 and the hub 22. The mutually facing broad sides of the wedge segments 27 each receive, with a respective recess defined by projecting sections of material, a respective angled end finger 35a of an omega spring 35. The spring 35 acts upon the wedge segments 27 in the circumferential direction, in particular in order to press them apart, it being possible during operation for the broad sides of the wedge segments 27 to touch and act on each other.

The driver 21 is secured axially on the outside of the fitting part provided with the collar 19 by a securing ring 43 which is preferably clipped on. The securing ring 43 extends in the axial direction along a part of the hub 22, so that the hub 22 does not directly bear against the inside of the collar 19 but, with the interposition of the securing ring 43, is supported in the collar 19 (and consequently the driver 21 is supported on the second fitting part 12). On the outside of the fitting part provided with the slide bearing bush 28 (in the present case of the first fitting part 11), a sealing ring 44 is provided between its radially outermost edge and the covering disc 25, such sealing ring being composed for example of rubber or of soft plastics material and being connected with, in particular clipped to, the covering disc 25. The sealing ring 44 can also be composed of metal and be tightly connected, for example welded, to the first fitting part 11, the covering disc 25 then being movable relative to the sealing ring 44. Within the installation space between the two fitting parts 11 and 12, a separating ring 45, composed for example of plastics material, is optionally provided as internal sealing.

The wedge segments 27 (and the spring 35) define an eccentric which, in the extension of the direction of eccentricity, presses the toothed wheel 16 into the toothed ring 17 at an engagement site. When drive is effected by means of the rotating drive shaft 7 which rotates (several times), a torque is first of all transmitted onto the driver 21 and then, by means of the driver segment 29, onto the eccentric which is so defined and which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement.

As a result, the inclination of the backrest 4 is continuously adjustable between several use positions.

Instead of the driver 21 which is configured in one piece and composed of plastics material, alternatively a metal driver which is configured in one piece and made, for example, of diecast zinc or diecast aluminum, as is described for example in U.S. Pat. No. 7,314,250 B1, or a driver which is configured of two pieces, composed of a metal ring (preferably of sintered material) with a driver segment 29 and a plastic component which is connected to it so as to be rotationally secure and which has a hub 22 and a covering disc 25, as is known for example from US 2009/0127910A1, can be used. The relevant disclosure of the printed publications U.S. Pat. No. 7,314,250 B1 and US 2009/0127910A1 is expressly incorporated herein by reference in its entirety.

Figure 1:
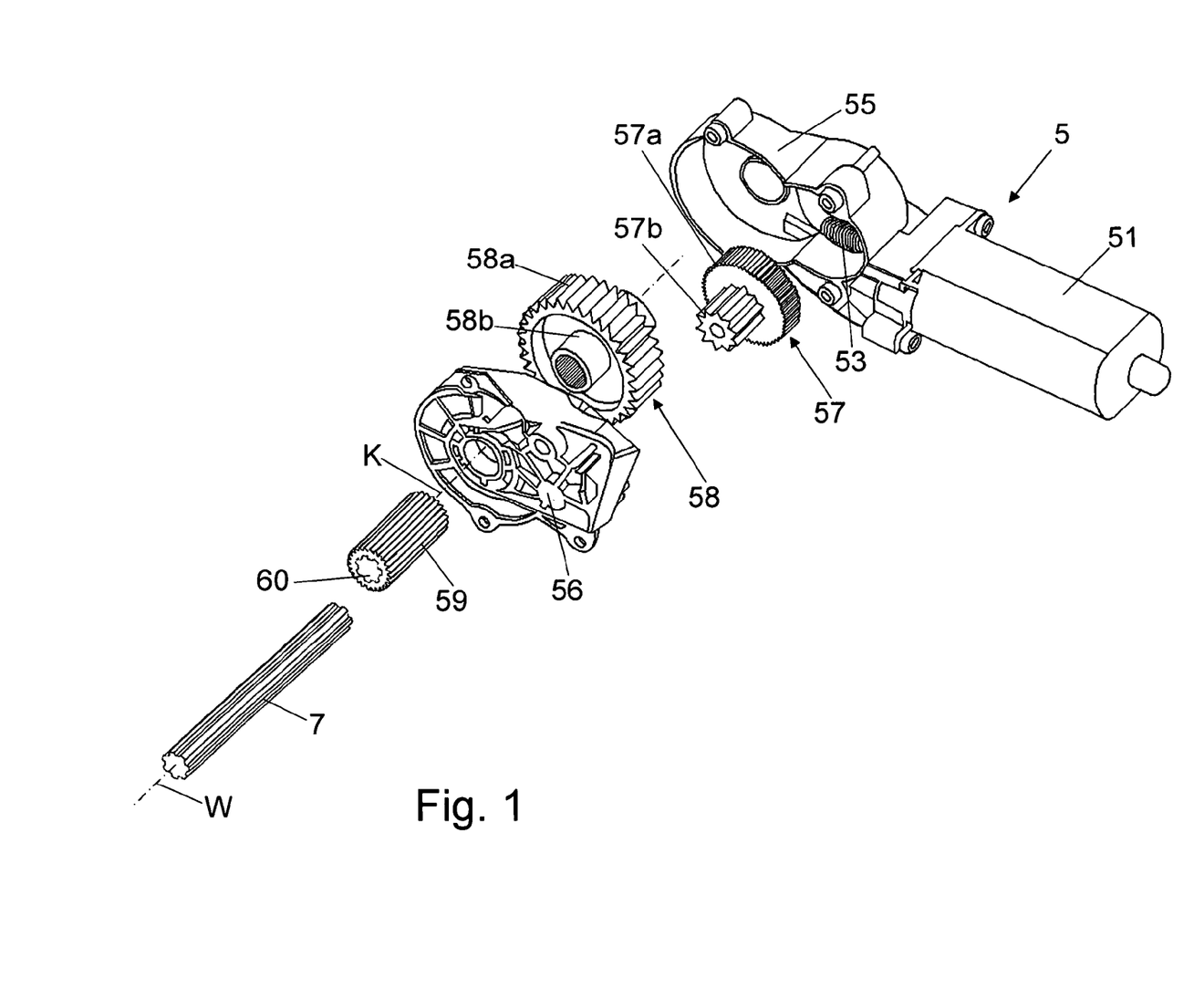
FIG. 1 is a partly schematic exploded view of the drive unit.
Figure 2:
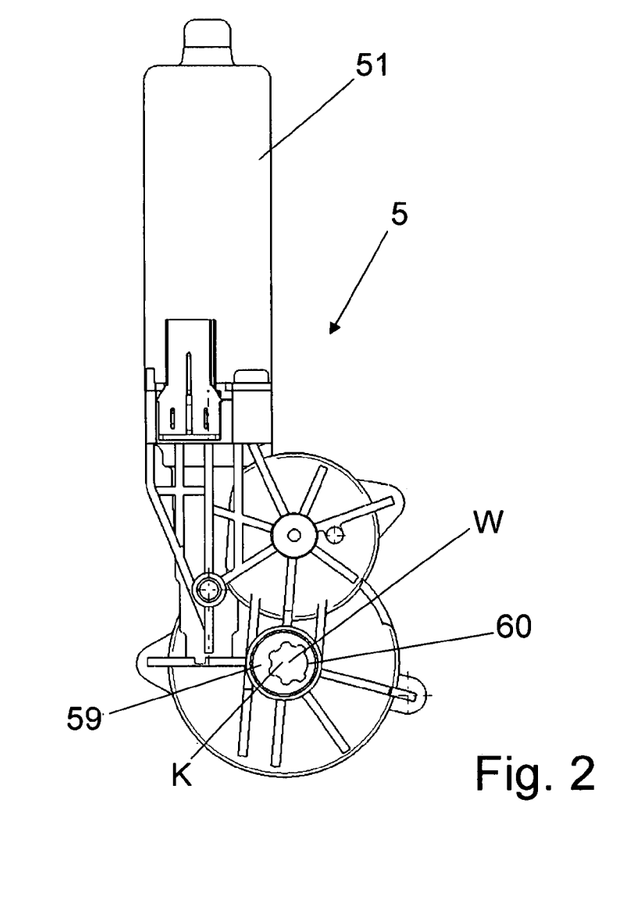
FIG. 2 is a side view of the drive unit.

The drive unit 5 has a motor 51 which is provided with a motor shaft 53 as drive output. The motor 51 is, for example an electronically commuted motor with a stator and a rotor, which define the motor shaft 53. A brush-commuted motor 51 can be used as well. The drive unit also has a two-stage gear unit which is provided on the drive output side of the motor 51. The motor shaft 53 serves as a drive for this gear unit. A gearbox casing 55 which is configured to be semi-open and which is fixed to the casing of the motor 51, and a gearbox cover 56 which encloses the gearbox casing 55 and which is fixed to it, enclose the parts of the gear unit.

The two-stage gear unit in the present case consists of a worm gear and a spurgear stage. The worm gear results from a worm which sits on the motor shaft 53 and which is shrinked on or otherwise fixed to the motor shaft 53 as a formed-on component (i.e. in one piece) of said motor shaft, and from a drive input toothing 57a of a spur gear with straight-cut gears which meshes with the worm and which is hereinafter denominated intermediate gear 57 and is rotatably supported on the gearbox casing 55 and (aligned with this supporting site) on the gearbox cover 56. The intermediate gear 57 which is formed in one piece has, on a step which is axially offset with respect to its drive input toothing 57a, a drive output toothing 57b which is concentric to the drive input toothing 57a of the intermediate gear 57 and has a smaller diameter. The spurgear stage results from the drive output toothing 57b of the intermediate gear 57 and of a drive output toothing 58 of a further spur gear with straight-cut gears, which hereinafter is referred to as drive output wheel 58, which meshes with is and which is rotatably supported on the gearbox casing 55 and (aligned with this supporting site) on the gearbox cover 56.

Figure 3A:
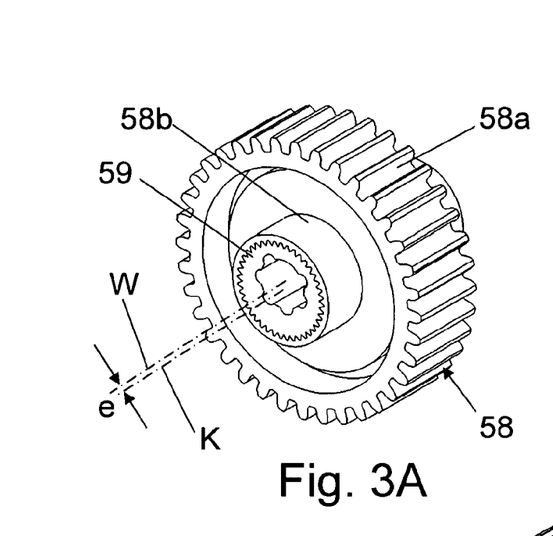
FIG. 3A is a perspective view of the drive output wheel.

The drive output wheel 58 has, on a disc-shaped basic body, radially outward the drive input toothing 58a and, configured in one piece with it, a journal pin 58b which is arranged concentrically to the drive input toothing 58a in the center of the drive output wheel 58 and axially protrudes from the basic body. The axially continuously hollow journal pin 58b can be configured, for example, as a collar formation. The radial outside of the journal pin 58b serves for supporting the drive output wheel 58. A core 59 which is configured separately from the drive output wheel 58 and which has a cylindrical basic shape is inserted in the hollow journal pin 58b and connected to it so as to be rotationally rigid by its form fit, for example by the core 59 being profiled, and the journal pin 58b having a profile on its inside which matches. The central axis of the core 59 is designated core axis K. The drive output wheel 58 is rotatably mounted about this core axis K, and the core 59 rotates about the core axis K. The core axis K is defined by the profile-free cylindrical basic shape of the core 59 (e.g. root circle or tip circle with approximately cylindrical, toothed profiles) or goes through the imaginary center of gravity of the core 59 (e.g. in the case of a polygonal profile). The journal pin 58b is accessible from the outside at its front ends even after the drive unit 5 has been assembled, so that the core 59 can be introduced also subsequently.

The core 59 has an axially continuous shaft receptacle 60 which is configured to receive the drive shaft 7 in a rotationally secure manner. The profile of the shaft receptacle therefore matches the profile of the drive shaft 7, i.e. in the present case the splined-shaft profile. The central axis of the shaft receptacle 60 is designated shaft axis W. The shaft axis W defines itself by the profile-free cylindrical basic shape of the shaft receptacle 60 (e.g. root circle or tip circle with approximately cylindrical, toothed profiles) or goes through the imaginary center of gravity of the shaft receptacle 60 (e.g. in the case of polygonal profiles). According to the invention, the core axia K and the shaft axis W are not aligned with each other, but they are offset in parallel by an eccentricity e relative to one another. This eccentricity e is, at the same time, the mean eccentricity of the fitting 10, i.e. the medium distance between the central axis of the collar 19 (of the second fitting part 12) and the central axis of the receptacle (of the first fitting part 11) for the eccentric, which is coated with the slide bearing bush 28. It is true that the eccentricity of the fitting 10, in its locked state (fixing in position) differs from the eccentricity during the driving process (displacement), but these differences are negligible.

The drive unit 5 therefore can—just as the fitting part 11 or 12 (in the present case the first fitting part 11) which is provided with the receptacle for the eccentric—be mounted also to be fixed with respect to the backrest. When assembling the vehicle seat 1, the drive unit 5 is mounted in such a way that the core axis K (which is aligned with the journal pin 58b and consequently with the drive output wheel 58) is aligned with the first fitting part 11 (which is aligned with its central receptacle), and more precisely at both fittings 10, i.e. on both sides of the vehicle seat. The drive shaft 7 and the core 59 are mounted in such a way that the drive shaft 7 (which is aligned with the hub 22 of the driver 21 and with the collar 19 of the second fitting part 12) is aligned with the shaft axis W.

During operation, when the drive unit 5 drives the drive shaft 7, the drive unit 5 superimposes a wobbling movement on the rotation of the drive shaft 7, which, in turn, compensates the wobbling rolling movement of the two fitting parts 11 and 12. Since the drive shaft 7—relative to the backrest 4—does not rotate about its own axis, i.e. the shaft axis W, but about the core axis K, thus carrying out a relative movement in space, it might be sensible to provide a respective hose having a corresponding diameter, which is arranged between one of the fittings 10 and the drive unit 5 each, and which is pushed over the drive shaft 7, so that the latter rotates inside the hose.

Figure 3B:
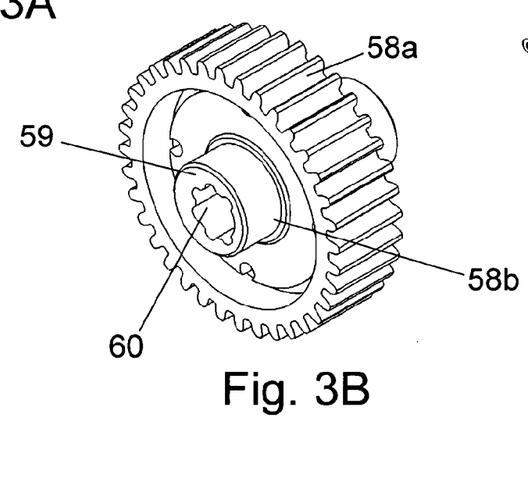
FIG. 3B is a perspective view of a modification of the drive output wheel.
Figure 3C:
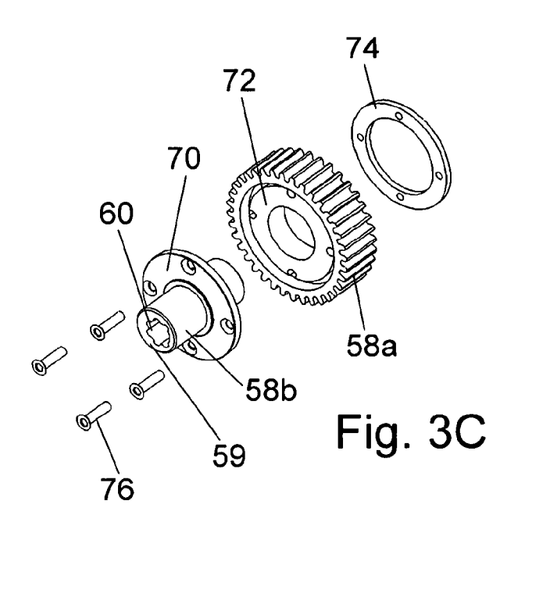
FIG. 3C is an exploded view of a further modification of the drive output wheel.

A plurality of modifications are conceivable for the drive output wheel 58 (FIG. 3A). The core 59 and the journal pin 58b can be configured in one piece (FIG. 3B). The journal pin 58b then is directly provided with the shaft receptacle 60, The number of components is thus reduced, but such a drive output wheel 58 must be exactly aligned to the fitting 10, i.e. to the shaft axis W on its collar 19, already when the drive unit 5 is fixed. Alternatively, the drive output wheel 58 can be configured in multiple pieces (FIG. 3C), i.e. the journal pin 58b—which is configured in one piece with the core 59—and the drive input toothing 58a are provided on different components. For example, a disc 70 can be arranged with the journal pin 58b on the one side of a toothed-wheel basic body 72 and be connected through this toothed-wheel basic body 72 with a counter-disc 74 on the other side of the toothed-wheel basic body 72, for example screwed by means of screws 76. Depending on the kind of fixation, such a drive output wheel 58 must be exactly aligned to the fitting 10 already when the drive unit 5 is fixed.

The drive shaft 7 can have a profile which deviates from a cyclical symmetry, for example by a missing tooth/rib (FIGS. 2 to 3C) or alternatively by a missing tooth gap/groove (not represented) of a profile which, for the rest, is symmetrical (in the present case a splined-shaft profile). In order to obtain as little weakening of the material as possible within the outer end areas of the core 59, the shaft receptacle 60 is preferably orientated in such a way that the missing tooth/rib faces radially outward (i.e. faced away from the core axis K), or that the missing tooth gap/groove faces radially inward (i.e. facing the core axis K).

Figure 7:
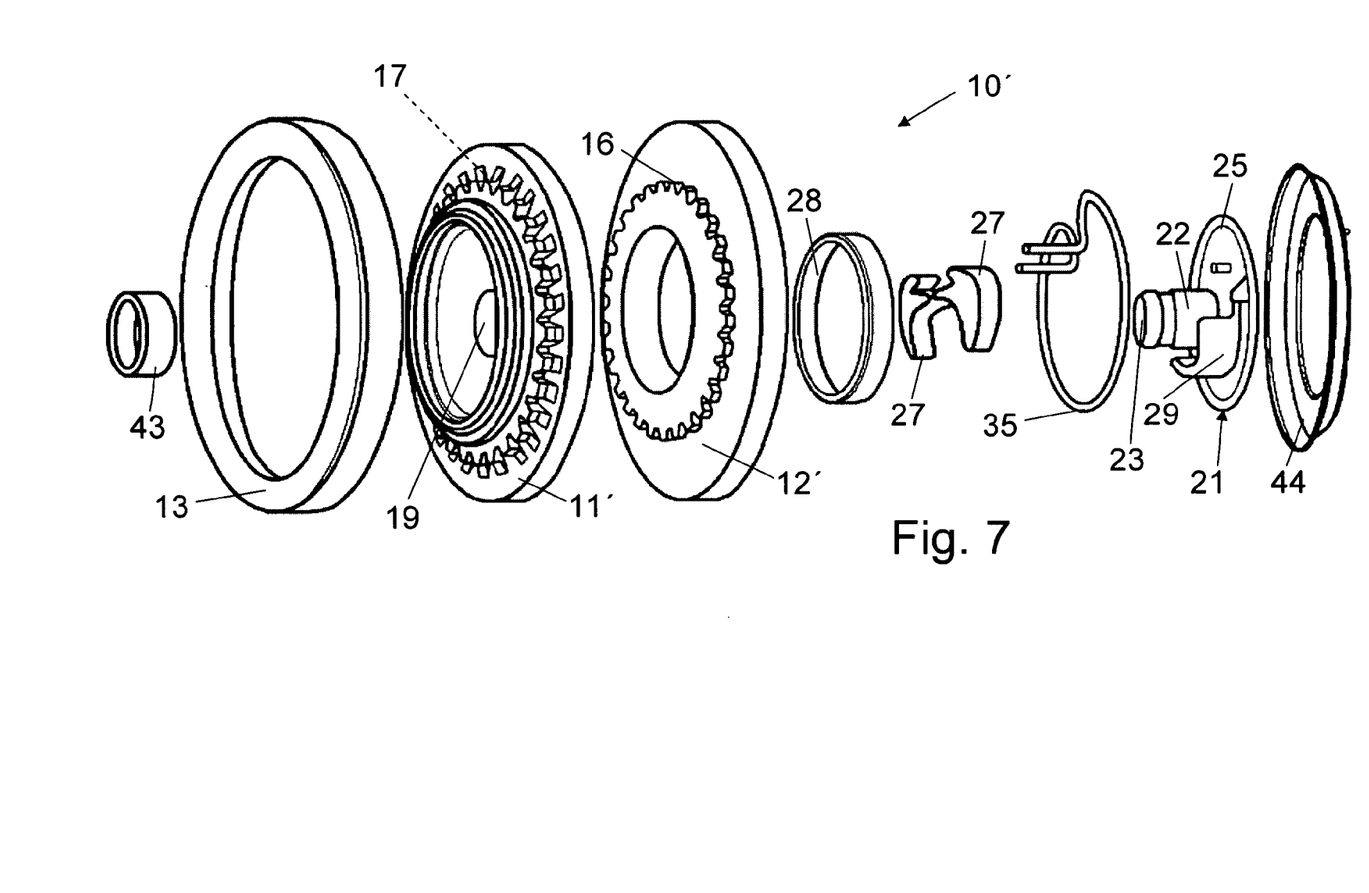
FIG. 7 is an exploded view of a modified fitting.

The drive unit 5 can be used also with a modified fitting 10' (with inverse supporting of the eccentric), the first fitting part 11' of which is fixed with respect to the seat part and is provided with the toothed ring 17 and the collar 19, and the second fitting part 12' of which is fixed with respect to the backrest and is provided with the receptacle (coated with the slide bearing bush 28) for the eccentric. The core axis K then is aligned with the receptacle of the second fitting part 12', while the shaft axis W is aligned with the hub 22 of the driver 21 and the collar 19 of the first fitting part 11'. The drive unit 5 can be used also with a modified fitting, the fitting parts of which are provided with radially protruding flanges, as described, for example, in DE 44 36 101 A1 or in DE 199 38 666 A1.

While specific embodiments of the invention have been described in detail to illustrate the application of the principles of the invention, it will be understood that the invention may be embodied otherwise without departing from such principles.

The invention claimed is:

1. A drive unit for a vehicle seat, the drive unit comprising:
a motor;
a drive shaft having a drive shaft profile and having a drive shaft axis;
a gear unit which is provided on a drive output side of the motor and which has at least a drive output wheel which is rotatably supported about a core axis, the drive output wheel being provided with a core which is rotatable about the core axis, the core having a shaft receptacle for receiving the drive shaft in a rotationally secure manner the drive shaft axis being a drive shaft central axis, the core axis and the drive shaft axis being offset in parallel by an eccentricity, wherein during operation, when the drive unit drives the drive shaft by a two stage-gear unit comprising a worm gear and a spur-gear stage, the drive unit superimposes a wobbling movement on the rotation of the drive shaft by the eccentricity of the core axis and the drive shaft axis, and the drive shaft rotates about the core axis and carries out a relative movement in space, wherein a gear axis of said spur-gear stage is parallel to said core axis and said drive shaft axis.

2. The drive unit as per claim 1, wherein:
said core has a profiled shaft receptacle, said profiled shaft receptacle having a profile which matches a profile of the drive shaft, said gear axis being located at a spaced location from said core axis and said drive shaft axis.

3. The drive unit as per claim 2, wherein the drive shaft axis is defined by a profile-free cylindrical basic shape of the shaft receptacle or by an imaginary center of gravity of the shaft receptacle.

4. The drive unit as per claim 1, wherein the core is configured separately from the drive output wheel and is connected with the drive output wheel so as to be rotationally secure.

5. The drive unit as per claim 4, wherein:
the drive output wheel has a hollow journal pin; and
the core is a profiled core that is introduced in the hollow journal pin of the drive output wheel, such hollow journal pin having a profile which matches a profile of the profiled core.

6. The drive unit as per claim 5, wherein the core axis is defined by a profile-free cylindrical basic shape of the core or by a center of gravity of the core.

7. The drive unit as per claim 1, wherein:
the core is configured in one piece with a journal pin for supporting the drive output wheel.

8. The drive unit as per claim 1, wherein a journal pin for supporting the drive output wheel is a one-piece component of the drive output wheel.

9. A vehicle seat drive system comprising:
a drive unit comprising a motor and a two stage-gear unit, said two-stage gear unit comprising a worm gear and a spur-gear stage, said spur-gear stage comprising a gear axis, a drive shaft having a drive shaft profile and having a drive shaft axis and a gear unit which is provided on a drive output side of the motor and which has at least a drive output wheel rotatably supported about a core axis, the drive output wheel comprising a core which is rotatable about the core axis, the core having a shaft receptacle for receiving the drive shaft in a rotationally secure manner, the drive shaft axis being a shaft central axis, the core axis and the drive shaft axis being offset in parallel by an eccentricity, wherein during operation, when the drive unit drives the drive shaft via said two stage-gear unit, the drive unit superimposes a wobbling movement on the rotation of the drive shaft via said eccentricity of said core axis and said drive shaft axis, and the drive shaft rotates about the core axis and carries out a relative movement in space, said gear axis being parallel to said core axis and said drive shaft axis; and
one fitting which has an eccentric epicyclic gear with the eccentricity as a mean eccentricity.

10. The system as per claim 9, wherein the fitting comprises:
a first fitting part, on which a toothed ring is configured;
a second fitting part, on which a toothed wheel is configured, which meshes with the toothed ring, the two fitting parts being in geared connection with each other; and
a rotatably supported rotating eccentric which is driven by a driver, for driving a relative rolling movement of the toothed wheel and the toothed ring, said gear axis being located at a spaced location from said core axis and said drive shaft axis.

11. The system as per claim 10, wherein the eccentric supports the first fitting part, the first fitting part having a central receptacle supported on a collar of the second fitting part.

12. The system as per claim 11, wherein the central receptacle of the first fitting part is aligned with the core axis, and the collar of the second fitting part is aligned with the shaft axis.

13. A motor vehicle seat comprising:
a seat part;
a backrest;
a vehicle seat drive system, the inclination of the backrest being adjustable by means of the vehicle seat drive system, the vehicle seat drive system comprising a drive unit comprising a motor and a two stage-gear unit, said two stage-gear unit comprising a worm gear and a spur-gear stage, said spur-gear stage comprising a gear axis, a drive shaft having a drive shaft profile and having a drive shaft axis and a gear unit which is provided on a drive output side of the motor and which has at least a drive output wheel rotatably supported about a core axis, the drive output wheel comprising a core which is rotatable about the core axis, the core having a shaft receptacle for receiving the drive shaft in a rotationally secure manner, the drive shaft axis being a shaft central axis, the core axis and the shaft axis being offset in parallel by an eccentricity, wherein during operation, when the drive unit drives the drive shaft via said two stage-gear unit, the drive unit superimposes a wobbling movement on the rotation of the drive shaft via said eccentricity of said core axis and said drive shaft axis, and the drive shaft rotates about the core axis and carries out a relative movement in space, said gear axis being parallel to said core axis and said drive shaft axis; and a fitting which has an eccentric epicyclic gear with the eccentricity as a mean eccentricity wherein the drive unit is fixed to the backrest.

14. A motor vehicle seat according to claim 13, wherein the fitting comprises:
a first fitting part, on which a toothed ring is configured;
a second fitting part, on which a toothed wheel is configured, which meshes with the toothed ring, the two fitting parts being in geared connection with each other; and
a rotatably supported rotating eccentric which is driven by a driver, for driving a relative rolling movement of the toothed wheel and the toothed ring.

15. A motor vehicle seat according to claim 14, wherein said shaft receptacle comprises a profiled shaft receptacle, the profiled shaft receptacle having a profile which matches a profile of the drive shaft.

16. A motor vehicle seat according to claim 14, wherein the drive shaft axis is defined by a profile-free cylindrical basic shape of the shaft receptacle or by an imaginary center of gravity of the shaft receptacle.

17. A motor vehicle seat according to claim 14, wherein the core is configured separately from the drive output wheel and is connected with the drive output wheel so as to be rotationally secure.

18. A motor vehicle seat according to claim 14, wherein:
the drive output wheel has a hollow journal pin; and
the core is a profiled core that is introduced in the hollow journal pin of the drive output wheel, the hollow journal pin having a profile which matches a profile of the profiled core.

19. A motor vehicle seat according to claim 14, wherein the core axis is defined by a profile-free cylindrical basic shape of the core or by a center of gravity of the core.

20. A motor vehicle seat according to claim 13, wherein:
the eccentric epicyclic gear supports a first fitting part, said first fitting part having a central receptacle and said first fitting part being supported on a collar of a second fitting part; and
the central receptacle of the first fitting part is aligned with the core axis, and the collar of the second fitting part is aligned with the drive shaft axis, said gear axis being located at a spaced location from said core axis and said drive shaft axis, wherein the central receptacle of the first fitting part is aligned with the core axis, and the collar of the second fitting part is aligned with the drive shaft axis.

* * * * *